United States Patent
Jung et al.

(10) Patent No.: US 9,083,809 B2
(45) Date of Patent: Jul. 14, 2015

(54) MOBILE COMMUNICATION TERMINAL AND METHOD FOR RUNNING AN APPLICATION THEREIN

(75) Inventors: Jong-Hee Jung, Seoul (KR);
Sang-Kyung Oh, Seoul (KR);
Kyoung-Taek Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1321 days.

(21) Appl. No.: 11/510,144

(22) Filed: Aug. 25, 2006

(65) Prior Publication Data

US 2007/0049262 A1    Mar. 1, 2007

(30) Foreign Application Priority Data

Aug. 25, 2005    (KR) .................. 10-2005-0078351

(51) Int. Cl.
*H04M 1/725*    (2006.01)
*G06F 3/0489*   (2013.01)

(52) U.S. Cl.
CPC ....... *H04M 1/72519* (2013.01); *G06F 3/04895* (2013.01); *H04M 1/7258* (2013.01)

(58) Field of Classification Search
CPC ..... G06F 3/023; G06F 3/0236; G06F 3/0237; G06F 3/048; G06F 3/0482; G06F 3/0484; G06F 3/04895; G06F 15/0258; G06F 15/0266; G06F 17/21; G06F 17/243; G06F 2350/1004
USPC .......... 345/168–169, 173; 715/703, 708, 780, 715/810, 825, 864
See application file for complete search history.

(56) References Cited

U.S. PATENT DOCUMENTS

| | | | | |
|---|---|---|---|---|
| 5,289,393 A * | 2/1994 | Kaya | .............................. | 708/112 |
| 5,859,636 A * | 1/1999 | Pandit | .......................... | 715/204 |
| 5,946,647 A * | 8/1999 | Miller et al. | ...................... | 704/9 |
| 5,966,652 A * | 10/1999 | Coad et al. | ................. | 455/412.1 |
| 6,085,098 A * | 7/2000 | Moon et al. | ................... | 455/457 |
| 6,262,735 B1 * | 7/2001 | Etelapera | ...................... | 715/854 |
| 6,895,559 B2 * | 5/2005 | Forder | .......................... | 715/780 |
| 6,950,988 B1 * | 9/2005 | Hawkins et al. | .............. | 715/700 |
| 7,003,327 B1 * | 2/2006 | Payne et al. | .................... | 455/566 |
| 7,072,461 B2 * | 7/2006 | Padawer et al. | .......... | 379/355.09 |
| 7,426,689 B2 * | 9/2008 | Simonds et al. | .............. | 715/234 |
| 7,515,941 B2 * | 4/2009 | Kwon et al. | .................. | 455/564 |
| 7,617,201 B1 * | 11/2009 | Bedell et al. | ..................... | 707/5 |

(Continued)

FOREIGN PATENT DOCUMENTS

| | | |
|---|---|---|
| CN | 1592329 | 3/2005 |
| CN | 1658628 | 8/2005 |

(Continued)

OTHER PUBLICATIONS

Impress Corporation, Oct. 28, 2003.
"Siemens Mobile MC 60", Jan. 1, 2003.

*Primary Examiner* — Temesgh Ghebretinsae
*Assistant Examiner* — Keith Crawley
(74) *Attorney, Agent, or Firm* — The Farrell Law Firm, P.C.

(57) ABSTRACT

A mobile communication terminal and method for running an application therein. When a user inputs a variable in an idle state, variable-related applications are displayed. When the user selects a predetermined application, the input variable is input as an input value of a predetermined input field of the selected application.

16 Claims, 10 Drawing Sheets

(56) References Cited

U.S. PATENT DOCUMENTS

| | | | |
|---|---|---|---|
| 7,835,504 B1* | 11/2010 | Donald et al. | 379/88.11 |
| 8,615,546 B2* | 12/2013 | Nielsen et al. | 709/203 |
| 2002/0076109 A1* | 6/2002 | Hertzfeld et al. | 382/229 |
| 2003/0125093 A1 | 7/2003 | One | |
| 2003/0159109 A1 | 8/2003 | Rossmann et al. | 715/513 |
| 2004/0171375 A1* | 9/2004 | Chow-Toun | 455/418 |
| 2005/0097189 A1* | 5/2005 | Kashi | 709/217 |
| 2005/0235021 A1* | 10/2005 | Chen et al. | 708/142 |
| 2006/0088144 A1* | 4/2006 | Mitchell et al. | 379/88.17 |
| 2006/0123346 A1* | 6/2006 | Totman et al. | 715/748 |
| 2006/0217144 A1* | 9/2006 | Bonnelykke Kristensen et al. | 455/550.1 |
| 2009/0019377 A1* | 1/2009 | Chen et al. | 715/758 |

FOREIGN PATENT DOCUMENTS

| | | | |
|---|---|---|---|
| EP | 1 032 183 | 8/2000 | |
| EP | 1 104 151 | 5/2001 | |
| JP | 10-154069 | 6/1998 | |
| KR | 1020030077854 | 10/2003 | |
| KR | 1020040058719 | 7/2004 | |
| KR | 1020040090737 | 10/2004 | |
| KR | 1020050075672 | 7/2005 | |
| RU | 2004105275 | 3/2005 | |
| TW | 533373 | 5/2003 | |
| TW | 535383 | 6/2003 | |
| TW | 595192 | 6/2004 | |
| WO | WO 97/32439 | 9/1997 | |
| WO | WO2004/100510 | * 11/2004 | H04M 1/23 |

* cited by examiner

MOBILE COMMUNICATION TERMINAL AND METHOD FOR RUNNING AN APPLICATION THEREIN

PRIORITY

This application claims priority under 35 U.S.C. §119 to an application entitled "Mobile Communication Terminal and Method for Running an application Therein" filed in the Korean Intellectual Property Office on Aug. 25, 2005 and assigned Serial No. 2005-78351, the contents of which are incorporated herein by reference.

BACKGROUND OF THE INVENTION

1. Field of the Invention

The present invention relates to a mobile communication terminal and method for running an application therein.

2. Description of the Related Art

Generally, an application implemented in a mobile communication terminal receives a number or character for a predetermined input item from a user. After running the application, the user inputs a number or character in the input item provided by the application. When a text message is sent, the user selects a button for a Short Message Service (SMS), selects a menu option of "Message Sending", and inputs a receiver number or transmission message content. For example, when the user of the mobile communication terminal wants to send predetermined text to a receiver number, for example "010-123-4567", the user selects the "SMS" button, selects the menu option of 'Message Sending', inputs the receiver number, for example 0101234567 and transmission message content, then selects a menu option of "Send" to send a text message.

In the text message transmission method as described above, the user enters an associated application menu and then inputs the receiver number or transmission message content. When the receiver number or transmission message content is first displayed on the mobile communication terminal, the user must remember the displayed content or must make a record of the displayed content, in order to use the displayed content as an input value of a predetermined application.

The user is inconvenienced because he or she must input a number or character after running a predetermined application even when a special hot key is set for the predetermined application.

SUMMARY OF THE INVENTION

It is, therefore, an object of the present invention to provide a mobile communication terminal and a method thereof that allow a user to easily input a number or character for an application.

In accordance with an aspect of the present invention, there is provided a mobile communication terminal, including one or more applications implemented on the mobile communication terminal; a controller for outputting on a display unit variable-related applications when a user inputs a variable in an idle state, and inputting the input variable as an input value of a predetermined input field of a selected application when the user selects a predetermined application; the display unit for displaying the variable-related applications.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

A mobile communication terminal determines whether an input variable is a number or character when a user inputs a number or character in an idle state. If the input variable is a number, number-related applications are displayed. If the input variable is a character, character-related applications are displayed. When the user selects a predetermined application among the displayed applications, the input number/character is input to an input field of the selected application while the selected application runs. Therefore, the convenience for the user is improved because a number or character for a predetermined application can be input before the application runs even when the input field is not selected after a user desired application runs.

Preferred embodiments of the present invention will be described in detail herein below with reference to the accompanying drawings. In the following description, detailed descriptions of functions and configurations incorporated herein that are well known to those skilled in the art are omitted for clarity and conciseness.

Figure 1:
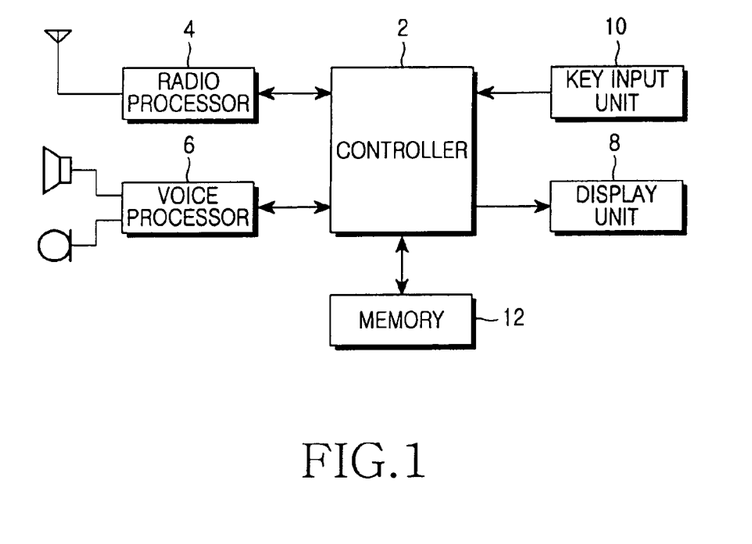
FIG. 1 is a block diagram illustrating a mobile communication terminal in accordance with the present invention.

FIG. 1 is a block diagram illustrating a mobile communication terminal in accordance with the present invention. Referring to FIG. 1, the mobile communication terminal is provided with a controller 2, a radio processor 4, a voice processor 6, a display unit 8, a key input unit 10, and a memory 12.

The controller 2 controls the overall operation of the mobile communication terminal. In accordance with the present invention, the controller 2 controls the running of various applications while performing an operation. When the user presses keys of the key input unit 10 in an idle state of the controller 2, the controller 2 detects a number in response to the pressed keys and then displays the number on the display unit 8. That is, the controller 2 is present in number input mode in the idle state. Moreover, the controller 2 switches to character input mode when a predetermined key is long pressed in the idle state, such that a character can be input. The predetermined key may be any key of the key input unit 10, for example, a "Cancel" key.

In the character input mode, the controller 2 switches to the number input mode when a predetermined key is long pressed. That is, number and character input switching is easy because the number input mode and the character input mode can be switched in a toggle scheme.

When a variable (e.g., a character or number) is input, the controller 2 displays variable-related applications. For example, the controller 2 can display application icons mapped to the UP, DOWN, LEFT, and RIGHT directional keys on the display unit 8, and can allow the user to know an application to be run according to the variable input by the user. The user can select a desired application by pressing one of the four directional keys.

That is, icons indicating four number-related applications are displayed on the display unit 8 when a number has been input. A general "number-related application" is an application in which a number is received from the user in operation. The general "number-related application" includes, but is not limited to, a calculator, a unit converter, a schedule management function, or a text message transmission function. When the user inputs a receiver number and presses the UP directional key under an assumption that the UP directional key of the four directional keys is mapped to the text message transmission function, the controller 2 of the terminal temporarily stores a receiver number, activates a menu option of the text message transmission function, and inputs the receiver number to an input field therefore. Moreover, the controller 2 controls the running of an associated application while performing a control operation such that the associated application can detect the input number as an input value of the input field.

Moreover, the controller 2 switches from the number input mode to the character input mode when in the idle state the "Cancel" key is long pressed by the user. When the user inputs characters in the character input mode, the controller 2 displays an icon indicating at least one character-related application on the display unit 8.

A general "character-related application" is an application in which a character is received from the user in operation. The general "character-related application" includes, but is not limited to, a text message transmission function, or a schedule management function. If the user presses a key mapped to the text message transmission function, the controller 2 of the terminal temporarily stores input text content in the memory 12, outputs a menu option of the text message transmission function, and inputs the text content to an input field for message content.

However, when a variable unsuitable for an associated application has been input, the controller 2 outputs an alarm message through the display unit 8 and allows the user to input a number or character in a proper input format. For example, the controller 2 allows the user to input a suitable number of digits/letters for an associated application. Alternatively, the controller 2 allows the user to input a number in a range suitable for the associated application.

For example, when the user inputs a number of digits unsuitable for an existing format of a mobile phone number such as 12345 or so on and selects a text message transmission application among displayed applications, the controller 2 can output an alarm messages such as "This is incorrect format" on the display unit 8. When the user inputs letters exceeding a limit of text message length and selects the text message transmission application among displayed applications, the controller 2 can output an alarm message of "This exceeds transmission text capacity" on the display unit 8.

The radio processor 4 converts voice data and control data to a radio signal and transmits the radio signal. Moreover, the radio processor 4 receives a radio signal, converts the received radio signal to voice data and control data, and outputs the voice data and the control data. The voice processor 6 converts the voice data to audible sound and outputs the audible sound. Moreover, the voice processor 6 converts a voice signal received from a microphone to voice data and then outputs the voice data. The key input unit 10 can be configured by a plurality of number and character keys. The key input unit 10 is a device for receiving a keyword to retrieve a phone number, and outputs a keyword input signal to the controller 2. The display unit 8 can be implemented with a Liquid Crystal Display (LCD). In accordance with the present invention, the display unit 8 is responsible for displaying an application through a User Interface (UI) or Graphic User Interface (GUI). The memory 12 stores a plurality of applications and data, and is provided with a buffer for temporarily storing a number/character input of the user.

Figure 2:
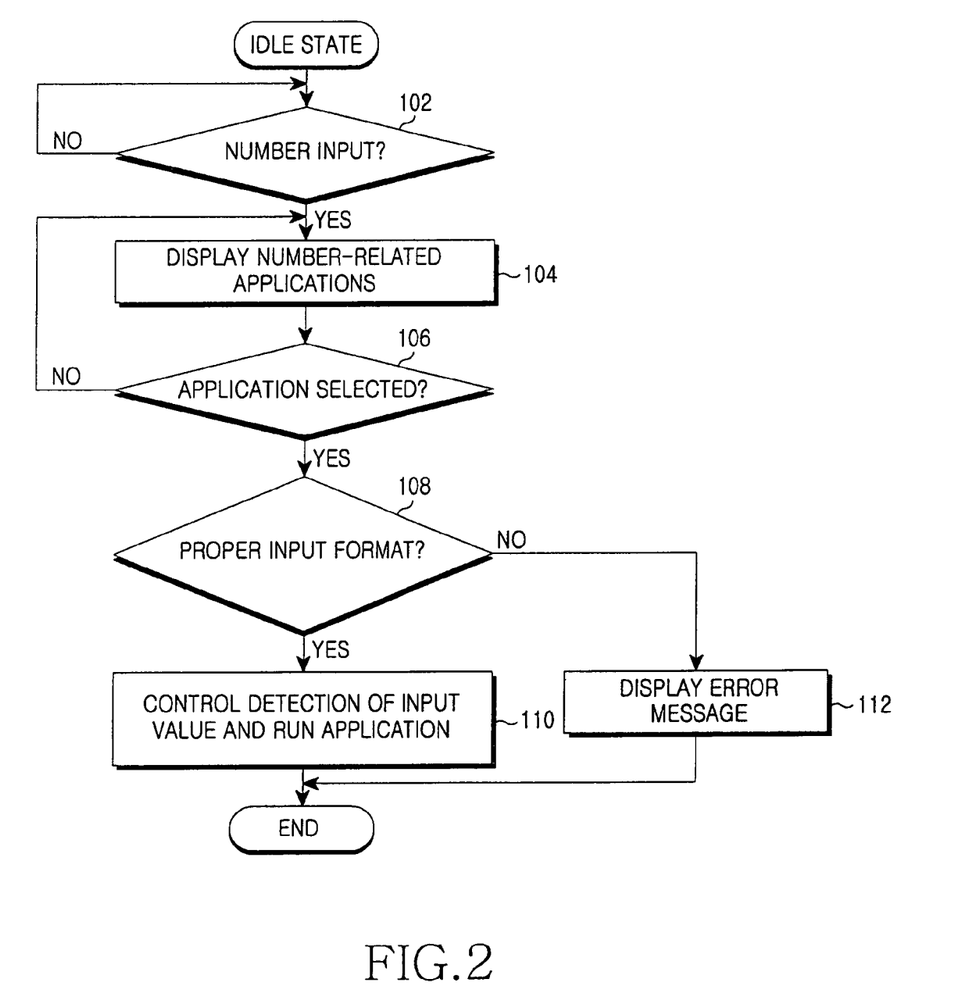
FIG. 2 is a flowchart illustrating a control process for running a number-related application in the mobile communication terminal in accordance with the present invention.
Figure 3A:
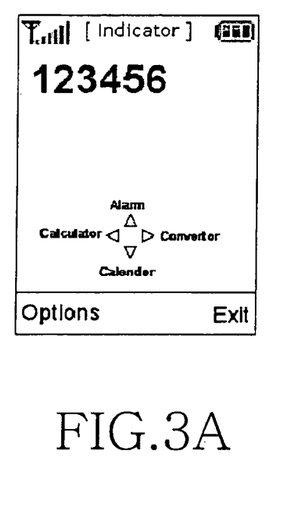
FIGS. 3A and 3B illustrate examples of screens of a display unit when a number-related application runs in accordance with the present invention.
Figure 3B:
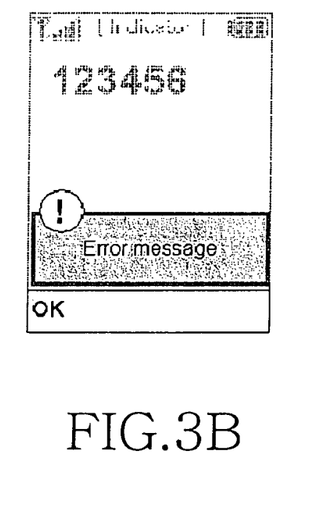

FIG. 2 is a flowchart illustrating a control process for running a number-related application in the mobile communication terminal in accordance with the present invention. FIGS. 3A and 3B illustrate examples of screens of the display unit 8 when a number-related application runs in accordance with the present invention.

Referring to FIG. 2, the controller 2 of the mobile communication terminal determines whether the user inputs a number at the time of the idle state in step 102. When the user inputs a number, the controller 2 proceeds to step 104 to output number-related applications on the display unit 8. For example, when the user inputs 123456 in the idle state, the controller 2 outputs to the display unit 8 as illustrated in FIG. 3A. Referring to FIG. 3A, the number-related applications are displayed on the screen along with keys mapped thereto. Thus, the user can run a desired application among the displayed applications by selecting a key mapped thereto.

Subsequently, the controller 2 monitors which one of the displayed applications is selected by the user in step 106. When the user selects a predetermined application, the controller 2 determines whether the input number conforms to a number input format for the selected application in step 108. If the input number does not conform to the number input format for the selected application, the controller 2 proceeds to step 112 to output an error message on the display unit 8 indicating that the input number is not suitable for the input format of the application. The error message is displayed as illustrated in FIG. 3B. At this time, the error message may differ according to an application.

However, if the input number conforms to the number input format for the selected application, the controller 2 proceeds to step 110 to run an associated application while controlling the associated application to detect the input number as an input value of a predetermined input field. Alternatively, the controller 2 can temporarily store the number input by the user in the memory 12, and can input the input number to an associated input field of the application.

Figure 4:
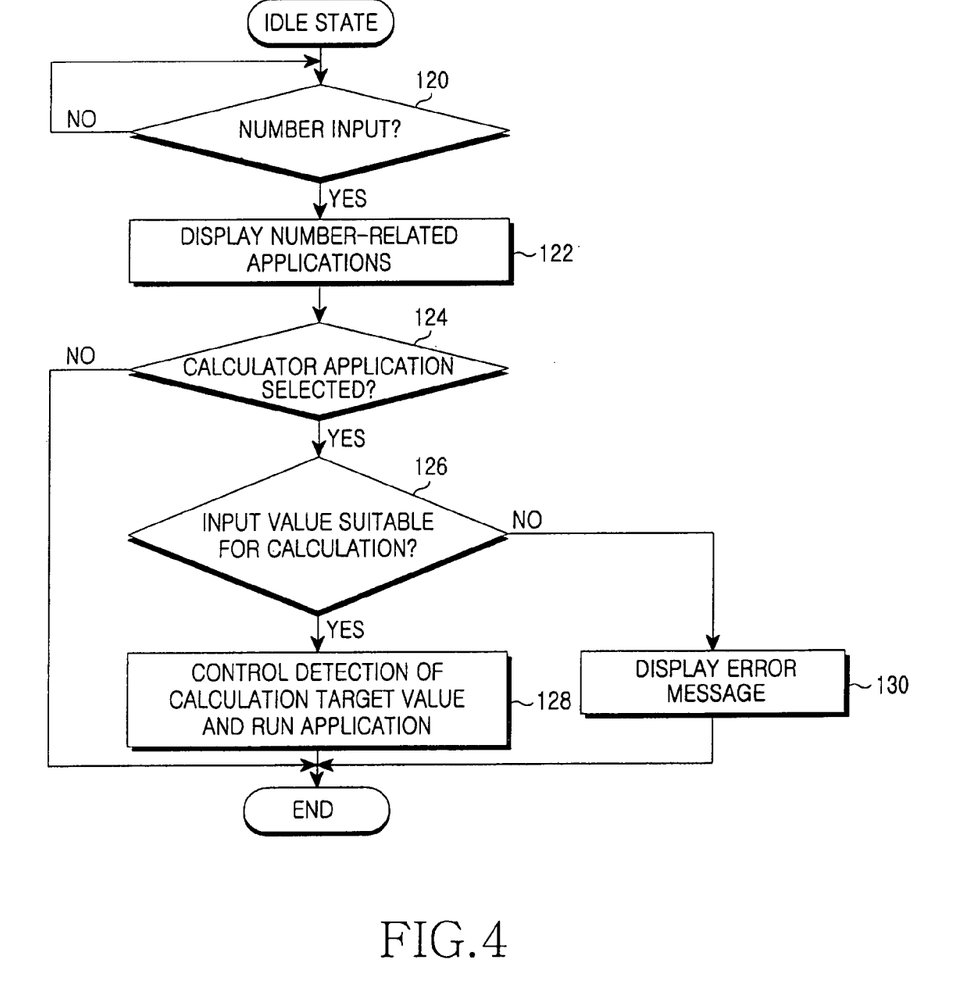
FIG. 4 is a flow chart illustrating a first embodiment for running a number-related application in the mobile communication terminal in accordance with the present invention.
Figure 5A:
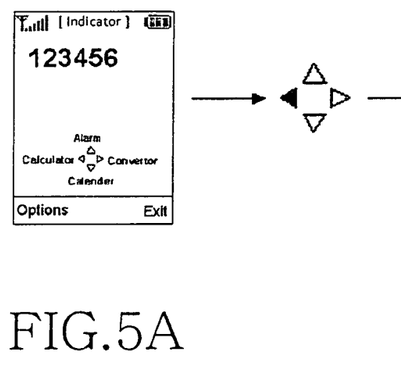
FIGS. 5A and 5B illustrate examples of screens of the display unit when a number-related application runs in accordance with the embodiment of FIG. 4.
Figure 5B:
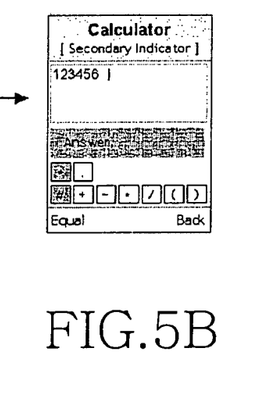

FIG. 4 is a flow chart illustrating a first embodiment for running a number-related application in the mobile communication terminal in accordance with the present invention, and FIGS. 5A and 5B illustrate examples of screens of the display unit when a number-related application runs in accordance with the embodiment of FIG. 4.

Referring to FIG. 4, the controller 2 of the mobile communication terminal determines whether the user inputs a number at the time of the idle state in step 120. If the user inputs a number, the controller 2 proceeds to step 122 to output number-related applications on the display unit 8 as illustrated in FIG. 5A. As described above, the "number-related applications" include but are not limited to a calculator, an alarm, a unit converter, a schedule management function, a text message transmission function. This embodiment corresponds to the case where the user selects a calculator application.

Thus, the controller 2 determines whether the user selects the calculator application in step 124. When the user selects the calculator application, the controller 2 proceeds to step 126 to determine whether the input number is an input value for which calculation is possible. In the calculator application, the number of digits for which the calculation is possible is designated. Therefore, the controller 2 must determine whether the number input by the user is an input value in a calculation range. If the input number has the number of digits for which the calculation is possible in the calculator application, the controller 2 proceeds to step 128 to run an associated application while controlling the calculator application to detect the input number as a calculation target value. When the application runs, a screen as illustrated in FIG. 5B is displayed. Referring to FIG. 5B, the number, input by the user, serving as the calculation target value is input to an input field of the calculator application.

If the input number does not have the number of digits for which the calculation is possible in the calculator application, the controller 2 outputs an error message on the display unit 8 in step 130. At this time, it is preferred that the error message is a message such as "You can input only N digits".

Figure 6A:
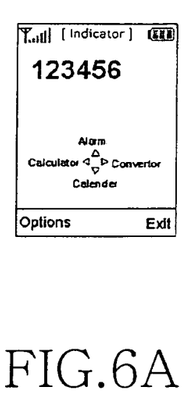
FIGS. 6A, 6B, and 6C illustrate examples of screens of the display unit when a unit converter application runs in accordance with the present invention.
Figure 6B:
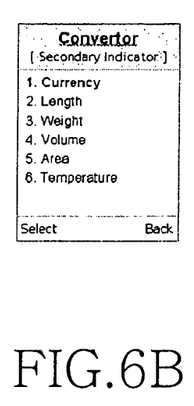
Figure 6C:
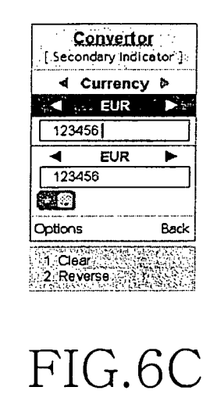

Similarly, the first embodiment can be applied to a unit converter application. FIGS. 6A, 6B, and 6c illustrate examples of screens of the display unit when the unit converter application runs in accordance with the present invention. When the user selects the unit converter application after inputting a number, the controller 2 determines whether the input number is an input value for which unit conversion is possible. In the unit converter application similar to the calculator application, the number of digits for which the unit conversion is possible is designated. Therefore, the controller 2 must determine whether the number input by the user is an input value within a unit conversion range. If the input number has an input value for which the unit conversion is possible, the controller 2 runs an associated application while controlling the unit converter application to detect the input number as a unit conversion target value. This case is illustrated in FIG. 6. FIG. 6A illustrates a screen in which a number is input by the user. When the application runs, a screen as illustrated in FIG. 6B is displayed. Referring to FIG. 6B, the number input by the user is detected as the unit conversion target value in the unit converter application, and the unit converter application displays a screen for asking the user which unit is applied for an associated number. When the user selects Currency, the controller 2 inputs the input number corresponding to the unit conversion target value to an input field as illustrated in FIG. 6C.

Figure 7:
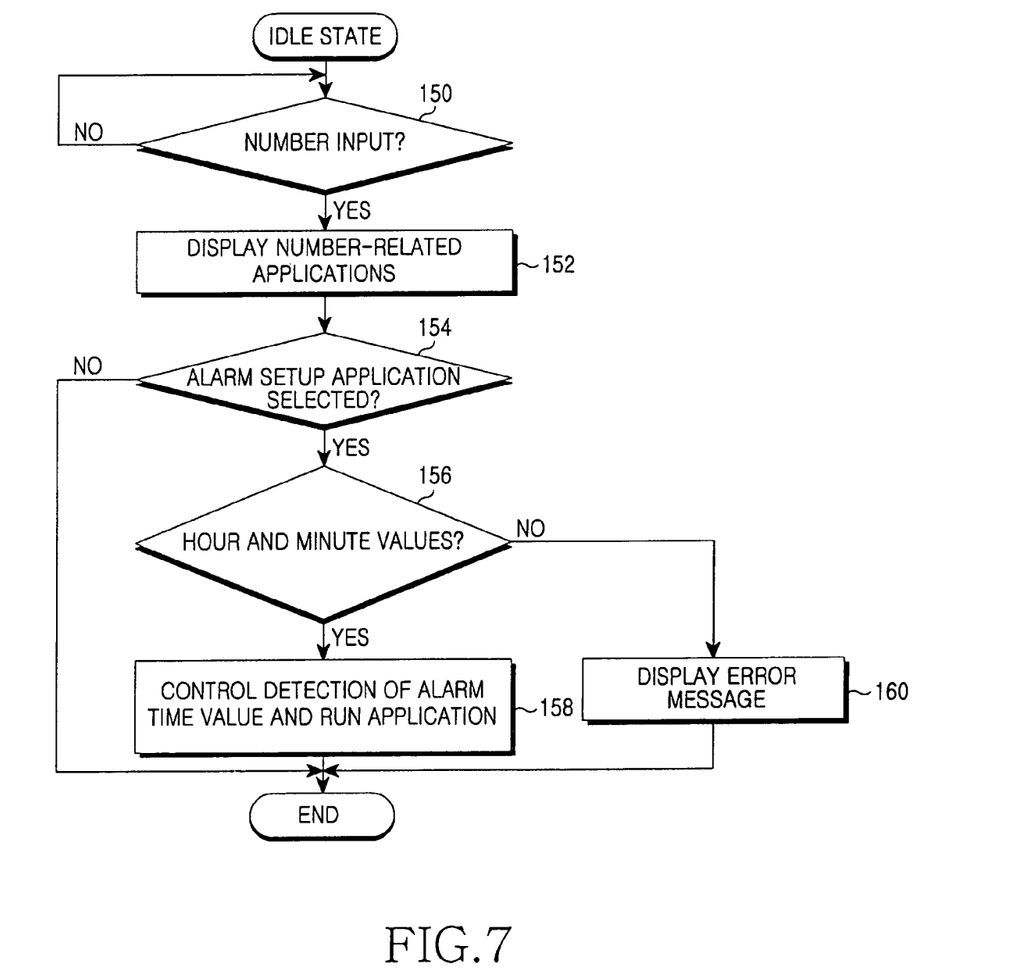
FIG. 7 is a flow chart illustrating a second embodiment for running a number-related application in the mobile communication terminal in accordance with the present invention.

FIG. 7 is a flow chart illustrating a second embodiment for running a number-related application in the mobile communication terminal in accordance with the present invention, and FIGS. 8A, 8B, 8C, 8D, and 8E illustrate examples of screens of the display unit when a number-related application runs in accordance with the embodiment of FIG. 7.

Figure 8A:
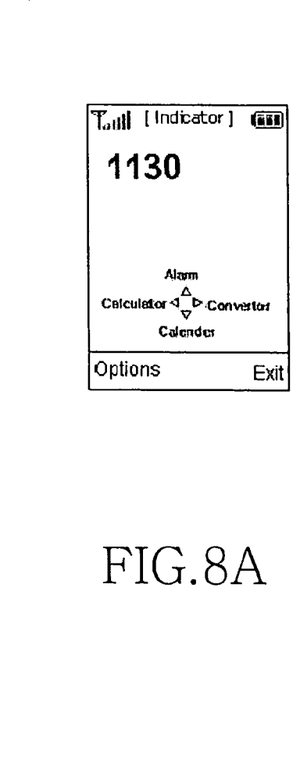
FIGS. 8A, 8B, 8C, 8D, and 8E illustrate examples of screens of the display unit when a number-related application runs in accordance with the embodiment of FIG. 7.
Figure 8B:
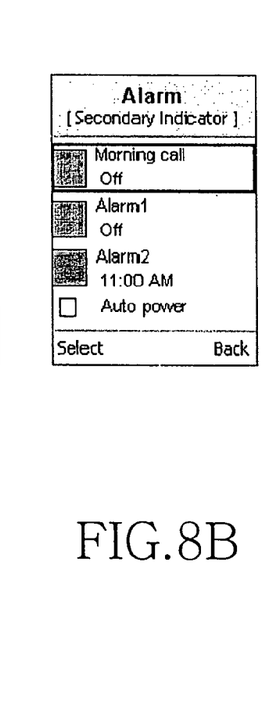

Referring to FIG. 7, the controller 2 of the mobile communication terminal determines whether the user inputs a number at the time of the idle state in step 150. If the user inputs a number, the controller 2 proceeds to step 152 to output number-related applications on the display unit 8 as illustrated in FIG. 8A. As described above, the "number-related applications" include, but are not limited to, a calculator, an alarm, a unit converter, a schedule management function, or a text message transmission function. This embodiment corresponds to the case where the user selects an alarm setup application.

Figure 8C:
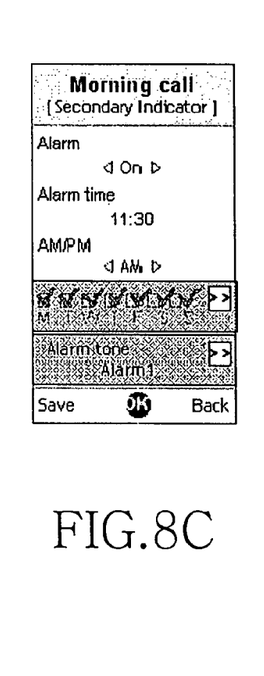
Figure 8D:
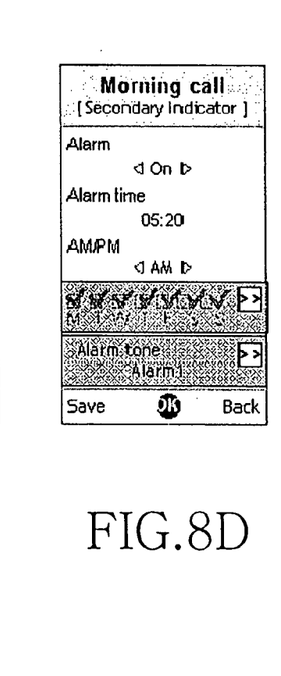

Thus, the controller 2 determines whether the user selects the alarm setup application in step 154. If the user selects the alarm setup application, the controller 2 proceeds to step 156 to determine whether the input number indicates hour and minute values. The alarm setup application generally receives an alarm time from the user. When the user inputs a number and selects the alarm setup application, the controller 2 detects the first two digits of the input number as the hour value and detects the last two digits of the input number as the minute value. In a number of 1130 corresponding to the number input by the user in FIG. 8A, a value of 11 is detected as the hour value and a value of 30 is detected as the minute value. In this case, it is preferred that the input number is fixed to four digits. When the input number is a three-digit number, the controller 2 can detect the value of the first digit as the hour value and can detect the value of the remaining two digits as the minute value. For example, when the input number is 520, the value of the first digit is detected as the hour value and the value of the remaining two digits are detected as the minute value, such that the input number of 520 is detected as a time of 05:20 as illustrated in FIG. 8D.

Subsequently, the controller 2 determines whether the detected hour value is in a proper time range. Similarly, the controller 2 determines whether the detected minute value is in a proper time range. The hour value indicates one of 12 hours and the minute value indicates one of 60 minutes of one hour. If the input number indicating the hour and minute values is in the proper time range, the controller 2 proceeds to step 158 to run an associated application while controlling the alarm setup application to detect the input number as an alarm time value.

The alarm setup application detects the number input by the user as the alarm time value. Then, the alarm setup application displays a screen for asking the user which alarm is set up for an associated number as illustrated in FIG. 8C. Referring to FIG. 8C, the user can select a type of alarm for the input alarm time value. In FIG. 8, Morning Call, Alarm1, and Alarm 2 are shown. The user selects a type of alarm for an input alarm time value. At this time, a cursor in a display screen is positioned on the highest-order alarm of an alarm list when a currently set alarm is absent or all possible alarms (e.g., three alarms) are set up. When the currently set alarm and all unset alarms are present, the cursor is positioned on an empty alarm. If one or more empty alarms are present, the cursor can be positioned according to a proper criterion. When the user has shifted the cursor to select a desired alarm, the alarm setup application displays a screen for setting up an associated alarm as illustrated in FIG. 8C.

Figure 8E:
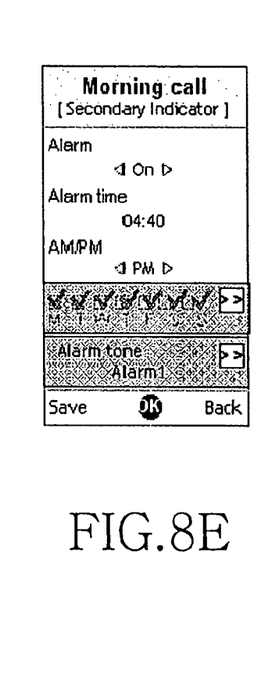

When the controller 2 determines whether the hour value is in the proper time range, the hour value can be expressed as one of 24 hours. For example, when the input number is 1640, the value of the first two digits is detected as the hour value and the value of the remaining two digits is detected as the minute value, such that the input number of 1640 is detected as a time of 04:40 as illustrated in FIG. 8E.

However, if the input number is out of the proper time range, the controller 2 proceeds to step 160 to output an error message on the display unit 8. At this time, the error message may be a message of "Input time is incorrect". When the user inputs a five-digit number, the controller 2 can output the error message on the display unit 8.

Figure 9A:
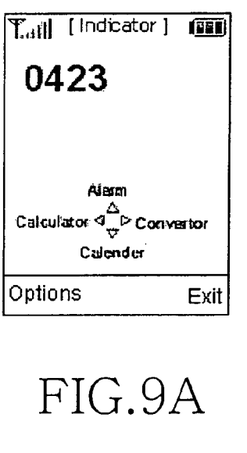
FIGS. 9A, 9B, and 9C illustrate example of screens of the display unit when a schedule management application runs in accordance with the present invention.
Figure 9B:
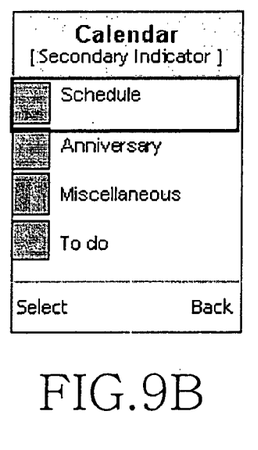
Figure 9C:
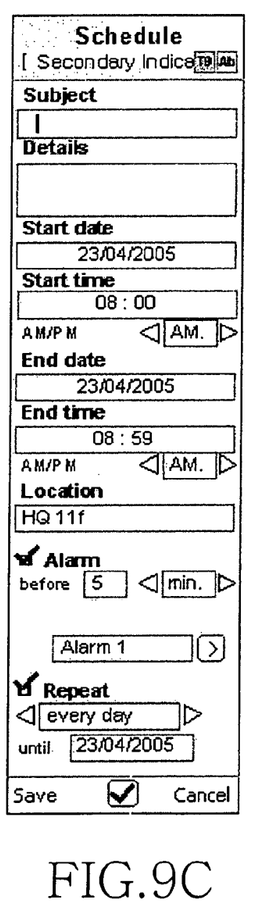

Similarly, the second embodiment can be applied to a schedule management application. FIGS. 9A, 9B, and 9C illustrate examples of screens of the display unit when the schedule management application runs in accordance with the present invention. When the user selects the schedule management application after inputting a number, the controller 2 determines whether the input number indicates month and day values. The schedule management application generally receives a management target date from the user. Thus, the controller 2 detects the input number as the management target date, and inputs the management target date to a date input field of the schedule management application. For this, the controller 2 detects a value of the first two digits of the input number as the month value and detects a value of the last two digits of the input number as the day value. In a number of 0423 corresponding to the number input by the user in FIG. 9A, a value of 04 is detected as the month value and a value of 23 is detected as the day value. In this case, it is preferred that the input number is fixed to four digits. The day value is valid only when it is one of available dates in the input month.

When the input number is in a proper date range, the schedule management application displays a screen for asking the user which schedule management is applied for an associated date as illustrated in FIG. 9B. Referring to FIG. 9B, types of schedule management include, but are not limited to, Schedule, Anniversary, or Miscellaneous. The user sets a type of schedule management to be applied for the input date. When the user selects Schedule, a screen for setting Schedule is displayed as illustrated in FIG. 9C, and the date input by the user is input to an associated input field.

Figure 10:
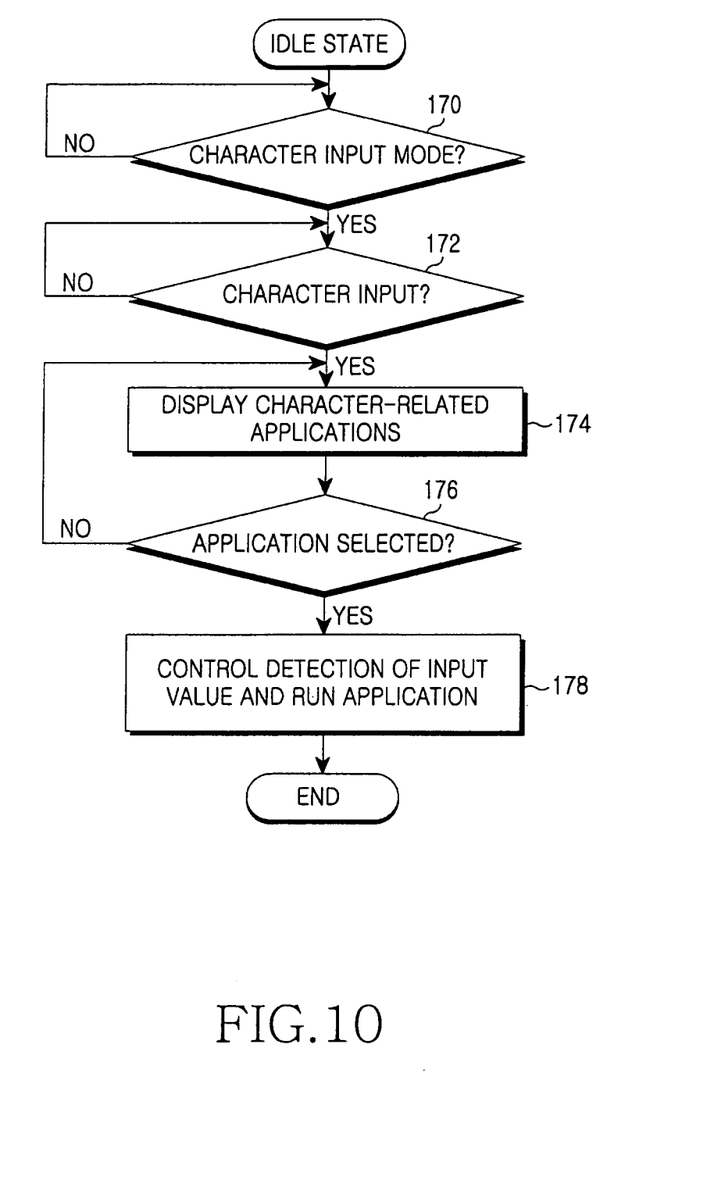
FIG. 10 is a flowchart illustrating a control process for running a character-related application in the mobile communication terminal in accordance with the present invention.

FIG. 10 is a flowchart illustrating a control process for running a character-related application in the mobile communication terminal in accordance with the present invention.

Referring to FIG. 10, the controller 2 of the mobile communication terminal determines whether the user enters the character input mode at the time of the idle state in step 170. When a predetermined key is long pressed by the user, the input mode is switched to the character input mode, such that a character can be input. The predetermined key is any key of the key input unit 10, e.g., the "Cancel" key. When the character input mode is entered, the controller 2 determines whether the user inputs a character in step 172. If the user inputs a character, the controller 2 outputs character-related applications on the display unit 8 in step 174. A general "character-related application" is an application in which a character is received from the user in operation. The general "character-related application" may be a text message transmission function, a schedule management function, or so on.

When the user selects one of the displayed applications, the controller 2 runs an associated application while performing a control operation such that the associated application can detect an input character as an input value.

As described above, the present invention provides a method for running an associated application after inputting a number or character corresponding to a target of interest of the user without a special application selection process. The user can quickly and conveniently use an application requiring a number/character input in a terminal by directly inputting number/character content to the terminal.

In the detailed description of the present invention, the concrete embodiments such as a calculator, a unit converter, an alarm function, a schedule management function, and so on have been described. Notably, the present invention can be applied to all applications in which a number or character is input. Therefore, the present invention is not limited to the above-described embodiments, but is defined by the following claims, along with their full scope of equivalents.

What is claimed is:

1. A mobile communication terminal, comprising:
   a key input unit having a plurality of keys;
   a display unit; and
   a controller configured to display a plurality of variable-related applications corresponding to a type of variable input through the key input unit on a display unit, and to input the input variable in a predetermined input field of an application selected from the plurality of variable-related applications,
   wherein the input variable is provided in a different form according to the selected application, and
   wherein different forms of the input variable include at least two of a mathematical operand, a time, a date, and a receiver number.

2. The mobile communication terminal of claim 1, wherein the controller is configured to determine whether the input variable conforms to an input format of the selected application, and outputs an error message on a display unit, if the input variable does not conform to the input format of the selected application.

3. The mobile communication terminal of claim 1, wherein the controller is configured to input the input variable as a calculation target value when the selected application is a calculator application.

4. The mobile communication terminal of claim 1, wherein the controller is configured to input the input variable as a unit conversion target value when the selected application is a unit converter application.

5. The mobile communication terminal of claim 1, wherein the controller is configured to input the input variable as an alarm time value when the selected application is an alarm setup application.

6. The mobile communication terminal of claim 1, wherein the controller is configured to input the input variable as a management target date value when the selected application is a schedule management application.

7. A method for running an application in a mobile communication terminal, comprising the steps of:
   displaying a plurality of variable-related applications corresponding to a type of variable input through a key input unit on a display unit; and
   inputting the input variable in a predetermined input field of an application selected from the plurality of variable-related applications,
   wherein the input variable is provided in a different form according to the selected application, and
   wherein different forms of the input variable include at least two of a mathematical operand, a time, a date, and a receiver number.

8. The method of claim 7, further comprising:
   determining whether the input variable conforms to an input format of the selected application; and
   displaying an error message if the input variable does not conform to the input format of the selected application.

9. The method of claim 7, further comprising inputting the input variable as a calculation target value when the selected application is a calculator application.

10. The method of claim 7, further comprising inputting the input variable as a unit conversion target value when the selected application is a unit converter application.

11. The method of claim 7, further comprising inputting the input variable as an alarm time value when the selected application is an alarm setup application.

12. The method of claim 7, further comprising inputting the input variable as a management target date value when the selected application is a schedule management application.

13. The mobile communication terminal of claim 1, wherein the plurality of keys includes a plurality of numeric keys and a plurality of non-numeric keys.

14. The method of claim 7, wherein the plurality of keys includes a plurality of numeric keys and a plurality of non-numeric keys.

15. The method of claim 14, wherein the type of the input variable is determined at least according to whether the input variable includes at least one non-numeric character.

16. The mobile communication terminal of claim 13, wherein the type of the input variable is determined at least according to whether the input variable includes at least one non-numeric character.

* * * * *